United States Patent
Wang et al.

(10) Patent No.: US 11,915,512 B2
(45) Date of Patent: Feb. 27, 2024

(54) THREE-DIMENSIONAL SENSING SYSTEM

(71) Applicant: Himax Technologies Limited, Tainan (TW)

(72) Inventors: Ching-Wen Wang, Tainan (TW);
Cheng-Che Tsai, Tainan (TW);
Ting-Sheng Hsu, Tainan (TW);
Min-Chian Wu, Tainan (TW)

(73) Assignee: Himax Technologies Limited, Tainan (TW)

(*) Notice: Subject to any disclaimer, the term of this patent is extended or adjusted under 35 U.S.C. 154(b) by 366 days.

(21) Appl. No.: 17/501,916

(22) Filed: Oct. 14, 2021

(65) Prior Publication Data
US 2023/0117269 A1    Apr. 20, 2023

(51) Int. Cl.
*G06V 40/16* (2022.01)
*G06T 17/00* (2006.01)
*G06V 20/64* (2022.01)

(52) U.S. Cl.
CPC .......... *G06V 40/161* (2022.01); *G06T 17/00* (2013.01); *G06V 20/653* (2022.01)

(58) Field of Classification Search
CPC ..... G06T 7/521; G06T 7/001; G01B 11/2513; G01B 11/2527; G01B 11/25; G01B 11/2531
See application file for complete search history.

(56) References Cited

U.S. PATENT DOCUMENTS

| | | | |
|---|---|---|---|
| 6,503,195 B1* | 1/2003 | Keller | G06T 7/521 348/45 |
| 6,862,207 B2* | 3/2005 | Wei | G11C 11/419 365/185.16 |
| 7,495,776 B2* | 2/2009 | Kubo | G01B 21/04 356/601 |
| 7,502,100 B2* | 3/2009 | Kawano | G01B 11/24 356/138 |
| 7,812,969 B2* | 10/2010 | Morimoto | G01B 11/2545 356/601 |
| 8,027,531 B2 | 9/2011 | Wilburn et al. | |
| 8,121,814 B2* | 2/2012 | Abe | G01B 11/25 702/167 |
| 9,142,019 B2* | 9/2015 | Lee | G06T 7/80 |
| 9,398,287 B2* | 7/2016 | Lee | H04N 13/239 |
| 9,407,837 B2* | 8/2016 | Lee | H04N 23/611 |
| 9,646,384 B2* | 5/2017 | Lee | G06V 20/647 |
| 10,250,789 B2* | 4/2019 | Lee | H04N 13/271 |

(Continued)

FOREIGN PATENT DOCUMENTS

WO    WO2019/200419 A2    10/2019

OTHER PUBLICATIONS

Office Action dated Jun. 30, 2023 in corresponding Taiwan Patent Application No. 111127270.

(Continued)

*Primary Examiner* — Yosef Kassa
(74) *Attorney, Agent, or Firm* — Donald E. Stout; Stout, Uxa & Buyan, LLP

(57) ABSTRACT

A three-dimensional sensing system includes a plurality of scanners each emitting a light signal to a scene to be sensed and receiving a reflected light signal, according to which depth information is obtained. Only one scanner executes transmitting corresponding light signal and receiving corresponding reflected light signal at a time.

19 Claims, 7 Drawing Sheets

(56) References Cited

U.S. PATENT DOCUMENTS

| | | |
|---|---|---|
| 2018/0135336 A1 | 5/2018 | Johnson et al. |
| 2020/0077075 A1 | 3/2020 | Denenberg et al. |
| 2022/0141445 A1 | 5/2022 | Malkin et al. |

OTHER PUBLICATIONS

Office Action dated Aug. 24, 2023 in corresponding Taiwan Patent Application No. 111127270.

* cited by examiner

THREE-DIMENSIONAL SENSING SYSTEM

BACKGROUND OF THE INVENTION

1. Field of the Invention

The present invention generally relates to three-dimensional (3D) sensing, and more particularly to a 3D sensing system with synchronous control.

2. Description of Related Art

Face detection, a specific case of object detection, is a computer technology used in a variety of applications (for example, mobile phones) to identify human faces in an image.

As conventional face detection techniques may be deceived, for example, by a two-dimensional (2D) picture containing the face to be detected, a three-dimensional (3D) scanning or sensing device is thus proposed to detect the face of a live person. A structured-light scanner is one of 3D scanning devices for measuring the 3D shape of an object using projected light patterns and a camera system. A time-of-flight camera is another of 3D scanning devices for resolving distance between the camera and the object to be scanned by measuring the round trip time of an artificial light signal provided by a laser or a light-emitting diode.

For conventional 3D scanning or sensing systems, particularly scanning devices with active light source and wide view angle, multiple sensing modules are commonly adopted to cover wide view angle. However, interference among the sensing modules is unavoidable, and erroneous depth information may probably be incurred.

A need has thus arisen to propose a novel scheme to overcome drawbacks of the conventional 3D scanning or sensing systems.

SUMMARY OF THE INVENTION

In view of the foregoing, it is an object of the embodiment of the present invention to provide a three-dimensional (3D) sensing system with synchronous control capable of correctly obtaining depth information without unwanted interference.

According to one embodiment, a three-dimensional sensing system includes a plurality of scanners each emitting a light signal to a scene to be sensed and receiving a reflected light signal, according to which depth information is obtained. Only one scanner executes transmitting corresponding light signal and receiving corresponding reflected light signal at a time.

DETAILED DESCRIPTION OF THE INVENTION

Figure 1A:
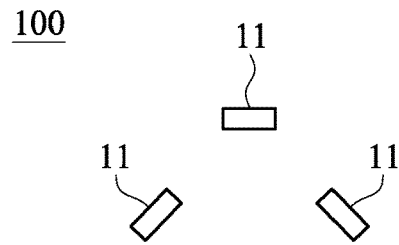
FIG. 1A shows a schematic diagram illustrating a three-dimensional (3D) sensing system with synchronous control according to one embodiment of the present invention.
Figure 1A:
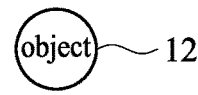

FIG. 1A shows a schematic diagram illustrating a three-dimensional (3D) sensing system 100 with synchronous control according to one embodiment of the present invention. Specifically, the 3D sensing system 100 may include a plurality of scanners 11 (three scanners are exemplified here) configured to obtain depth information of a scene (with or without an object 12) to be sensed. Although a scene with an object 12 is exemplified in the following embodiments, the scanners 11 of the present invention may be adapted well to a scene without an object. In one example, the scanners 11 may adopt structured light technique by projecting a predetermined pattern onto the object 12 and then capturing a reflected pattern, according to which the depth information may be obtained. In another example, the scanners 11 may adopt time-of-flight technique by transmitting a light signal onto the object 12 and then measuring round trip time of a reflected light signal, according to which the depth information may be obtained. Although structured light technique and time-of-flight technique are mentioned here, it is appreciated that the scanners 11 of the present invention may adopt other suitable techniques as well.

Figure 1B:
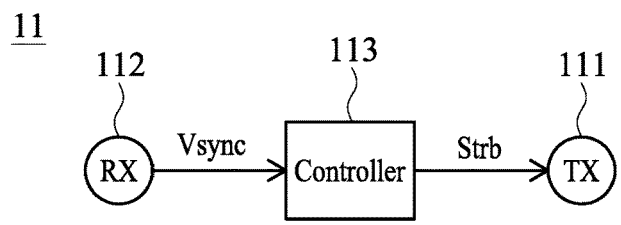
FIG. 1B shows a block diagram illustrating the scanner of FIG. 1A.

FIG. 1B shows a block diagram illustrating the scanner 11 of FIG. 1A. Specifically, the scanner 11 of the embodiment may include a transmitter (TX) 111, such as a projector in structured-light scheme or an illuminator in time-of-flight scheme, configured to emit a light signal onto the object 12. For example, the illuminator/projector may have a type of a single-light source, a scatter-light source or a floodlight source. The illuminator/projector may, for example, include a laser or a light-emitting diode such as edge emitting laser (EEL) or vertical-cavity surface-emitting laser (VCSEL).

The scanner 11 of the embodiment may include a receiver (RX) 112, such as a sensor (e.g., a camera), configured to receive a reflected light signal (from the object 12). The scanner 11 of the embodiment may include a controller 113, such as a 3D integrated circuit, configured to obtain the depth information by processing the reflected light signal (from the receiver 112), and to coordinate the transmitter 111 and the receiver 112 to perform sensing or scanning the object 12. Specifically, the controller 113 may control activation of transmitting the light signal (of the transmitter 111) via a transmit-control signal Strb, and the controller 113 may be notified of receiving the reflected light signal via a receive-control signal Vsync (from the receiver 112).

Figure 1C:
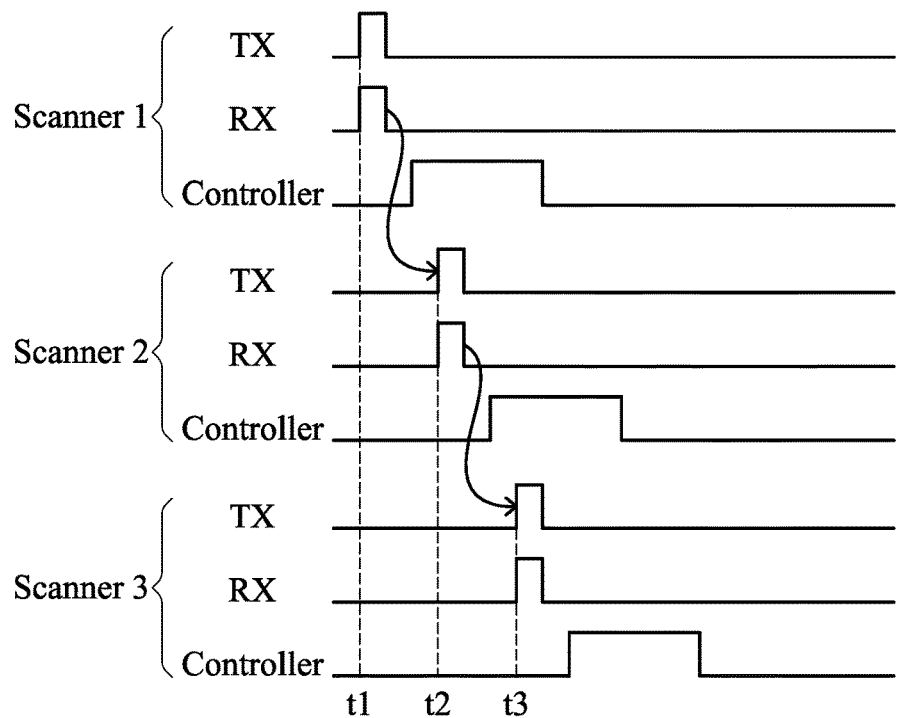
FIG. 1C shows exemplary timing diagrams illustrating pertinent signals related to the receiver, the transmitter and the controller of corresponding scanners.

FIG. 1C shows exemplary timing diagrams illustrating pertinent signals related to the receiver 112, the transmitter 111 and the controller 113 of corresponding scanners 11. According to one aspect of the embodiment, the scanners 11 are coordinated (or synchronized) in a time-division multiplexing (TDM) or interleaving manner such that only one of all the scanners 11 executes transmitting corresponding light signal (by the transmitter 111) and receiving corresponding reflected light signal (by the receiver 112) at a time. Alternatively speaking, only when one (and only one) of all the scanners 11 finishes transmitting corresponding light signal and receiving corresponding reflected light signal (but while processing corresponding reflected light signal), another one (and only one) of all the scanners 11 is then alternatively triggered to execute transmitting corresponding light signal and receiving corresponding reflected light signal. The above process repeats until all the scanners 11 have alternatively finished transmitting corresponding light signals and receiving corresponding reflected light signals. As exemplified in FIG. 1C, (only) when the first scanner finishes transmitting corresponding light signal and receiving corresponding reflected light signal (but while processing corresponding reflected light signal), the second scanner is then triggered to execute transmitting corresponding light signal and receiving corresponding reflected light signal. (Only) when the second scanner finishes transmitting corresponding light signal and receiving corresponding reflected light signal (but while processing corresponding reflected light signal), the third scanner is then triggered to execute transmitting corresponding light signal and receiving corresponding reflected light signal.

Figure 1D:
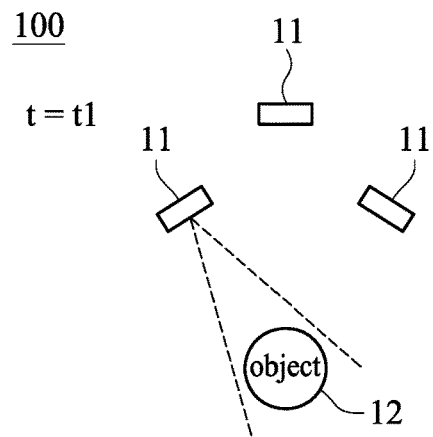
FIG. 1D to FIG. 1F show schematic diagrams illustrating the three scanners that execute transmitting corresponding light signals and receiving corresponding reflected light signals at different times.
Figure 1E:
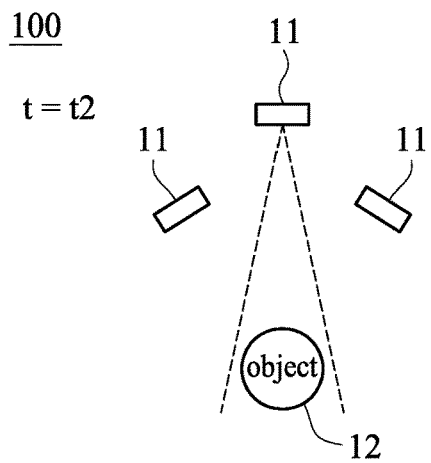
Figure 1F:
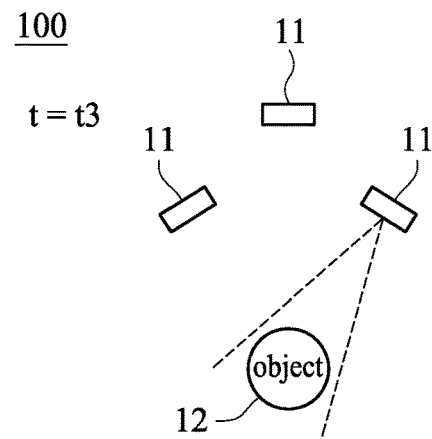

FIG. 1D to FIG. 1F show schematic diagrams illustrating the three scanners 11 that execute transmitting corresponding light signals and receiving corresponding reflected light signals at different times. As exemplified in the figures, only one scanner 11 executes transmitting corresponding light signal (by the transmitter 111) and receiving corresponding reflected light signal (by the receiver 112) at a time, and therefore no interference may be incurred among the scanners 11. Accordingly, depth information can be correctly obtained without interference.

Figure 2:
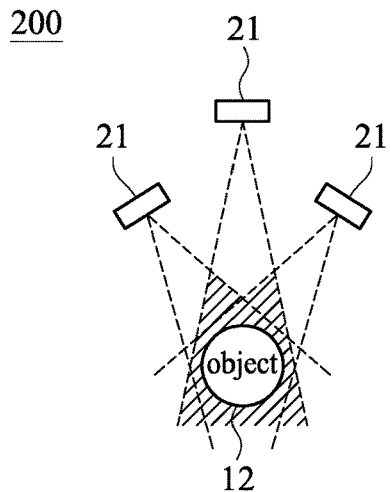
FIG. 2 shows a schematic diagram illustrating a 3D sensing system without adopting the synchronous control scheme of the embodiment.

FIG. 2 shows a schematic diagram illustrating a 3D sensing system 200 without adopting the synchronous control scheme of the embodiment. As demonstrated in FIG. 2, neighboring scanners 21 may probably transmit corresponding light signals and receive corresponding reflected light signals at the same time. Accordingly, the scanner 21 may probably receive (and be interfered by) neighboring reflected light signal (as denoted by shaded area) in addition to its own corresponding reflected light signal, thereby obtaining erroneous depth information (due to the neighboring reflected light signal).

Figure 3A:
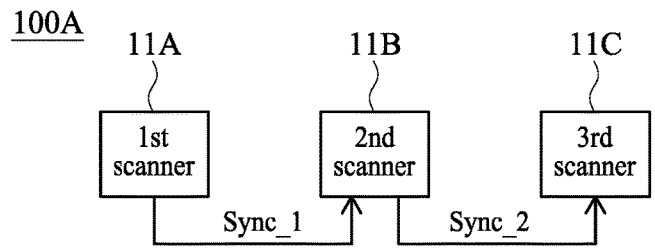
FIG. 3A shows a block diagram illustrating a 3D sensing system with synchronous control according to a first embodiment of the present invention.
Figure 3B:
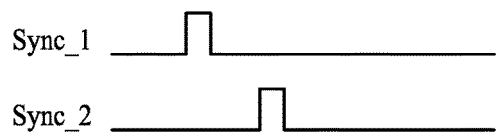
FIG. 3B shows timing diagrams illustrating pertinent trigger signals of FIG. 3A.

FIG. 3A shows a block diagram illustrating a 3D sensing system 100A with synchronous control according to a first embodiment of the present invention, and FIG. 3B shows timing diagrams illustrating pertinent trigger signals of FIG. 3A. The trigger signal is used to activate the transmitting corresponding light signal and receiving corresponding reflected light signal. Specifically, in the embodiment, a first scanner 11A (as a master scanner) issues a first trigger signal Sync_1 to a second scanner 11B (as a slave scanner). Subsequently, the second scanner 11B issues a second trigger signal Sync_2 to a third scanner 11C (as another slave scanner). It is appreciated that the trigger signals in this embodiment and the following embodiments may be transmitted in wired or wireless manner.

Figure 4A:
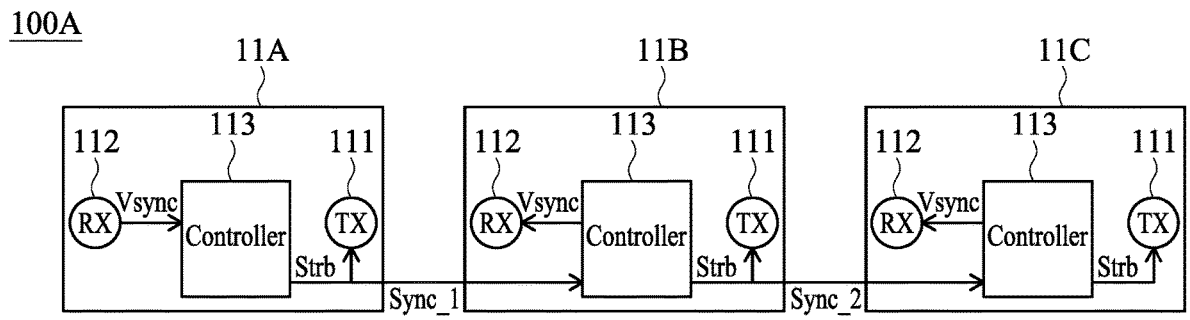
FIG. 4A shows a detailed block diagram illustrating a 3D sensing system with synchronous control according to a first exemplary embodiment of FIG. 3A.

FIG. 4A shows a detailed block diagram illustrating a 3D sensing system 100A with synchronous control according to a first exemplary embodiment of FIG. 3A. Specifically, in the embodiment, the trigger signals Sync_1 and Sync_2 are generated and received by the controllers 113. As exemplified in FIG. 4A, the first trigger signal Sync_1 is issued from the controller 113 of the first scanner 11A to the controller 113 of the second scanner 11B, and the second trigger signal Sync_2 is issued from the controller 113 of the second scanner 11B to the controller 113 of the third scanner 11C.

Figure 4B:
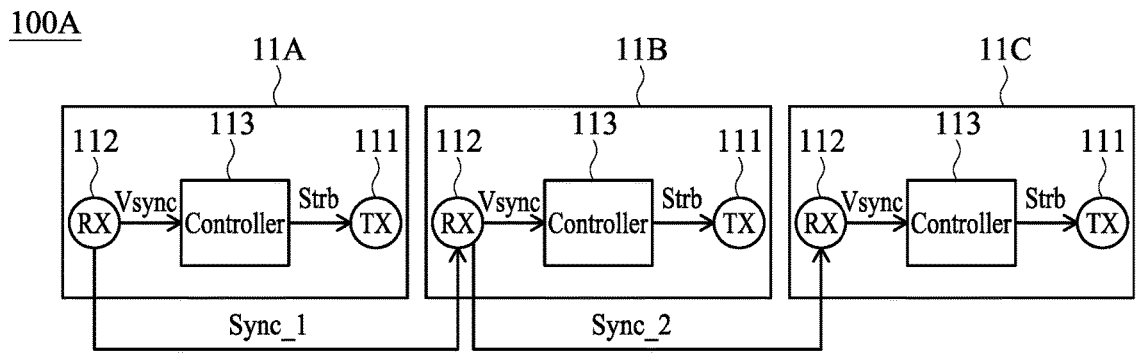
FIG. 4B shows a detailed block diagram illustrating a 3D sensing system with synchronous control according to a second exemplary embodiment of FIG. 3A.

FIG. 4B shows a detailed block diagram illustrating a 3D sensing system 100A with synchronous control according to a second exemplary embodiment of FIG. 3A. Specifically, in the embodiment, the trigger signals Sync_1 and Sync_2 are generated and received by the receivers 112. As exemplified in FIG. 4B, the first trigger signal Sync_1 is issued from the receiver 112 of the first scanner 11A to the receiver 112 of the second scanner 11B, and the second trigger signal Sync_2 is issued from the receiver 112 of the second scanner 11B to the receiver 112 of the third scanner 11C.

Figure 4C:
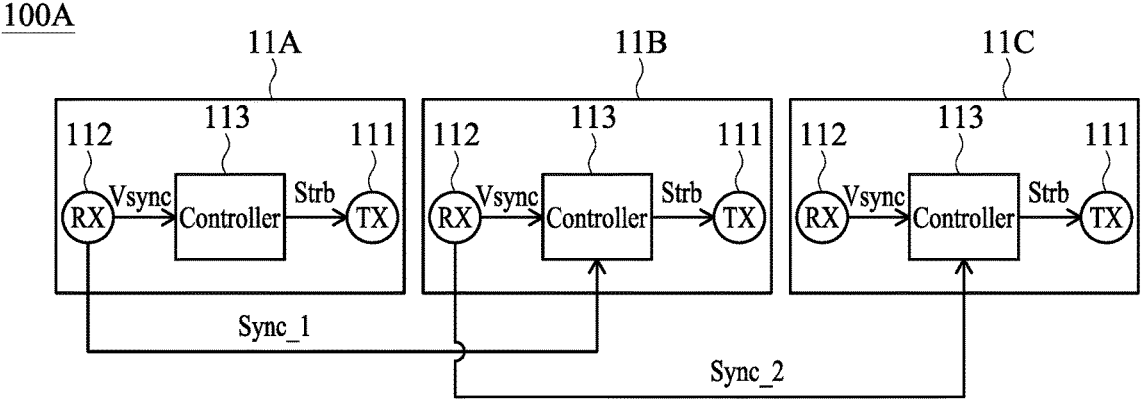
FIG. 4C shows a detailed block diagram illustrating a 3D sensing system with synchronous control according to a third exemplary embodiment of FIG. 3A.

FIG. 4C shows a detailed block diagram illustrating a 3D sensing system 100A with synchronous control according to a third exemplary embodiment of FIG. 3A. Specifically, in the embodiment, the trigger signals Sync_1 and Sync_2 are generated by the receivers 112 and received by the controllers 113. As exemplified in FIG. 4C, the first trigger signal Sync_1 is issued from the receivers 112 of the first scanner 11A to the controller 113 of the second scanner 11B, and the second trigger signal Sync_2 is issued from the receivers 112 of the second scanner 11B to the controller 113 of the third scanner 11C. Moreover, it is noted that the first trigger signal Sync_1 may be further relayed as Sync_1' to the receiver 112 within the second scanner 11B, and the second trigger signal Sync_2 may be further relayed as Sync_2' to the receiver 112 within the third scanner 11C.

Figure 4D:
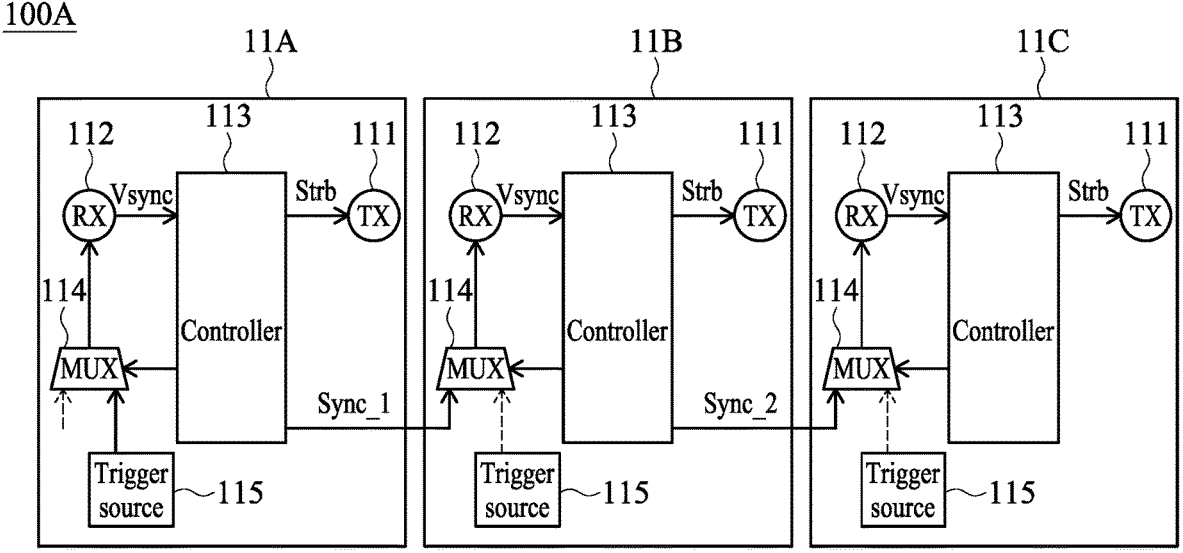
FIG. 4D shows a detailed block diagram illustrating a 3D sensing system with synchronous control according to a fourth exemplary embodiment of FIG. 3A.

FIG. 4D shows a detailed block diagram illustrating a 3D sensing system 100A with synchronous control according to a fourth exemplary embodiment of FIG. 3A. Specifically, the scanner 11A/11B/11C further includes a multiplexer (MUX) 114, controlled by the corresponding controller 113, configured to receive a trigger signal Sync_1 through Sync_3 of a preceding scanner 11A/11B/11C and a corresponding trigger source 115, one of which is selected and forwarded to the corresponding receiver 112. As exemplified in FIG. 4D, the multiplexer 114 of the first scanner 11A (as a master scanner)

is controlled by the corresponding controller 113 to select and forward the corresponding trigger source 115 to the corresponding receiver 112. On the other hands, the multiplexer 114 of the second scanner 11B or the third scanner 11C (as a slave scanner) is controlled by the corresponding controller 113 to select and forward the trigger signal (from the preceding scanner) to the corresponding receiver 112.

Figure 5A:
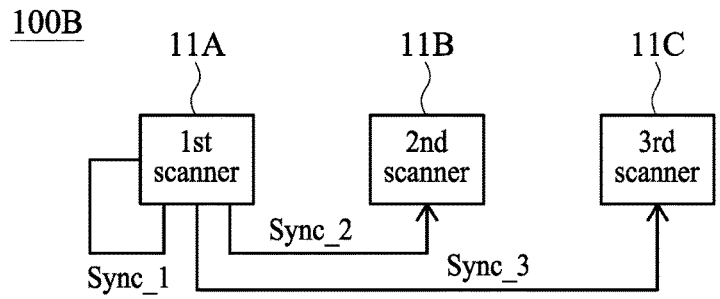
FIG. 5A shows a block diagram illustrating a 3D sensing system with synchronous control according to a second embodiment of the present invention.
Figure 5B:
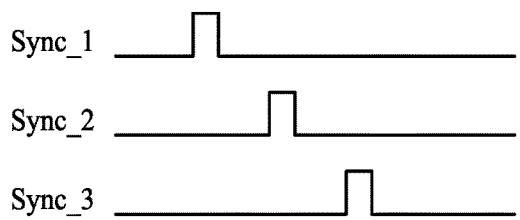
FIG. 5B shows timing diagrams illustrating pertinent trigger signals of FIG. 5A.

FIG. 5A shows a block diagram illustrating a 3D sensing system 100B with synchronous control according to a second embodiment of the present invention, and FIG. 5B shows timing diagrams illustrating pertinent trigger signals of FIG. 5A. Specifically, in the embodiment, a first scanner 11A (as a host scanner) issues a first trigger signal Sync_1 to itself (i.e., the first scanner 11A) to trigger transmitting corresponding light signal and receiving corresponding reflected light signal. Next, the first scanner 11A issues a second trigger signal Sync_2 to a second scanner 11B (as a guest scanner). Subsequently, the first scanner 11A issues a third trigger signal Sync_3 to a third scanner 11C (as another guest scanner).

Figure 6:
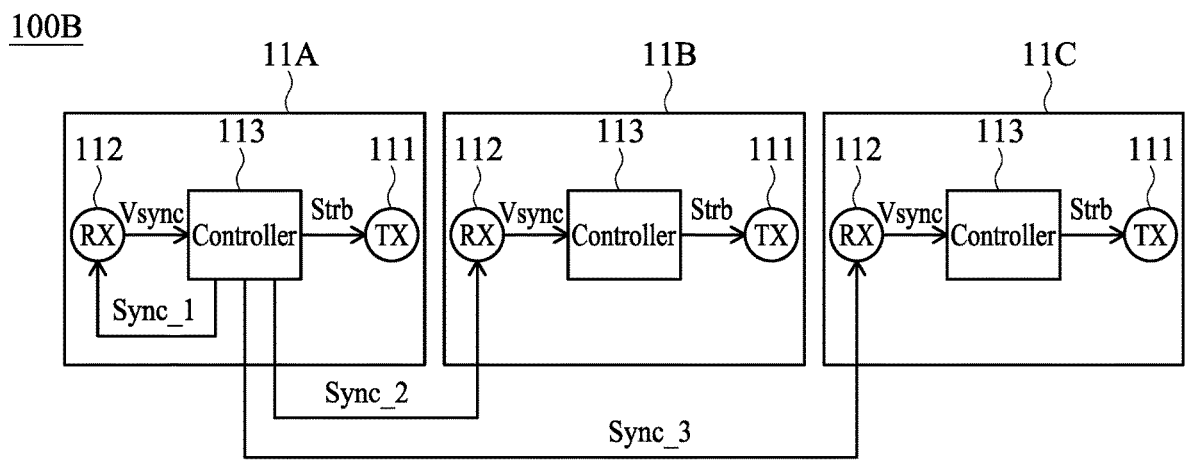
FIG. 6 shows a detailed block diagram illustrating a 3D sensing system with synchronous control according to an exemplary embodiment of FIG. 5A.

FIG. 6 shows a detailed block diagram illustrating a 3D sensing system 100B with synchronous control according to an exemplary embodiment of FIG. 5A. Specifically, in the embodiment, the trigger signals Sync_1 through Sync_3 are generated by the controller 113 (of the first scanner 11A), and received by the receivers 112. As exemplified in FIG. 6, the first trigger signal Sync_1 is issued from the controller 113 of the first scanner 11A to the receiver 112 of the first scanner 11A; the second trigger signal Sync_2 is issued from the controller 113 of the first scanner 11A to the receiver 112 of the second scanner 11B; and the third trigger signal Sync_3 is issued from the controller 113 of the first scanner 11A to the receiver 112 of the third scanner 11C.

Figure 7A:
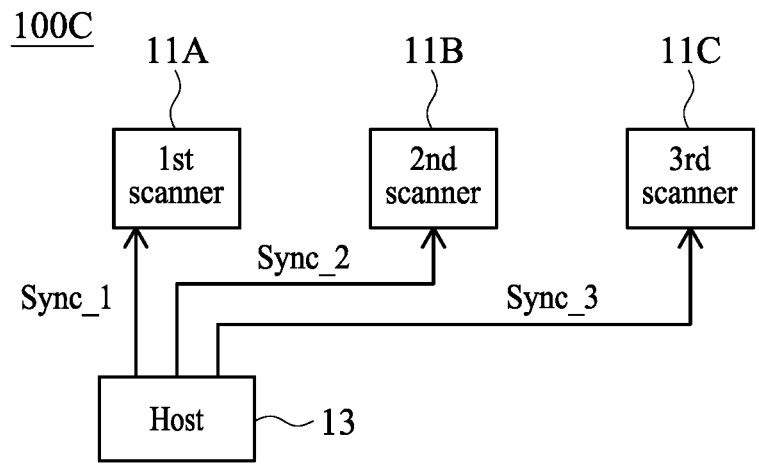
FIG. 7A shows a block diagram illustrating a 3D sensing system with synchronous control according to a third embodiment of the present invention.
Figure 7B:
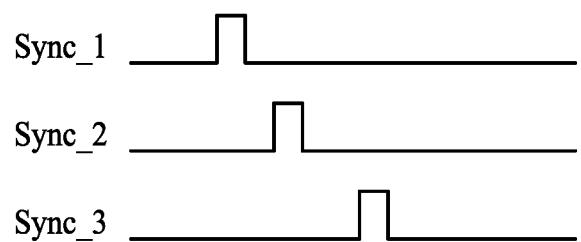
FIG. 7B shows timing diagrams illustrating pertinent trigger signals of FIG. 7A.

FIG. 7A shows a block diagram illustrating a 3D sensing system 100C with synchronous control according to a third embodiment of the present invention, and FIG. 7B shows timing diagrams illustrating pertinent trigger signals of FIG. 7A. The 3D sensing system 100C of the embodiment may include a host 13, external to the scanners 11A-11C, configured to issue trigger signals Sync_1 through Sync_3 to the scanners 11A-11C (as guest scanners). Specifically, the host 13 issues a first trigger signal Sync_1 to a first scanner 11A to trigger transmitting corresponding light signal and receiving corresponding reflected light signal. Next, the host 13 issues a second trigger signal Sync_2 to a second scanner 11B. Subsequently, the host 13 issues a third trigger signal Sync_3 to a third scanner 11C.

Figure 8A:
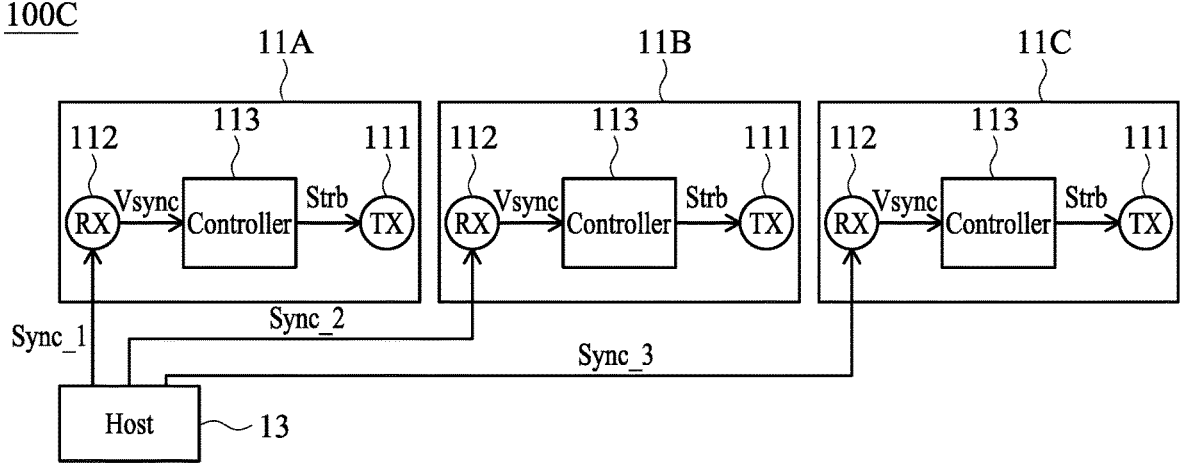
FIG. 8A shows a detailed block diagram illustrating a 3D sensing system with synchronous control according to a first exemplary embodiment of FIG. 7A.

FIG. 8A shows a detailed block diagram illustrating a 3D sensing system 100C with synchronous control according to a first exemplary embodiment of FIG. 7A. Specifically, in the embodiment, the trigger signals Sync_1 through Sync_3 are generated by the host 13, and received by the receivers 112 of the scanners 11A-11C. As exemplified in FIG. 8A, the first trigger signal Sync_1 is issued from the host 13 to the receiver 112 of the first scanner 11A; the second trigger signal Sync_2 is issued from the host 13 to the receiver 112 of the second scanner 11B; and the third trigger signal Sync_3 is issued from the host 13 to the receiver 112 of the third scanner 11C.

Figure 8B:
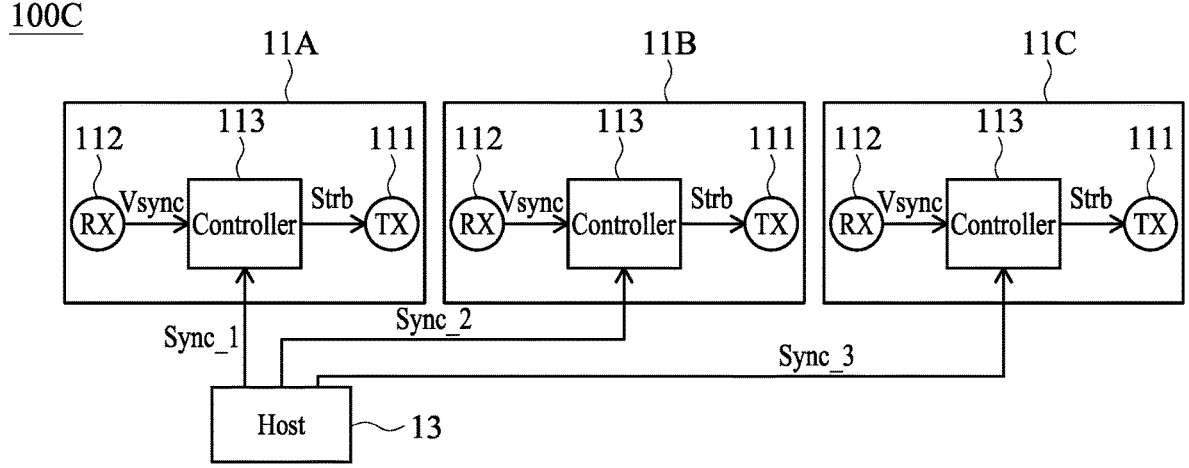
FIG. 8B shows a detailed block diagram illustrating a 3D sensing system with synchronous control according to a second exemplary embodiment of FIG. 7A.

FIG. 8B shows a detailed block diagram illustrating a 3D sensing system 100C with synchronous control according to a second exemplary embodiment of FIG. 7A. Specifically, in the embodiment, the trigger signals Sync_1 through Sync_3 are generated by the host 13, and received by the controllers 113 of the scanners 11A-11C. As exemplified in FIG. 8B, the first trigger signal Sync_1 is issued from the host 13 to the controller 113 of the first scanner 11A; the second trigger signal Sync_2 is issued from the host 13 to the controller 113 of the second scanner 11B; and the third trigger signal Sync_3 is issued from the host 13 to the controller 113 of the third scanner 11C. Moreover, it is noted that the first trigger signal Sync_1 may be further relayed as Sync_1' to the receiver 112 within the first scanner 11A; the second trigger signal Sync_2 may be further relayed as Sync_2' to the receiver 112 within the second scanner 11B; and the third trigger signal Sync_3 may be further relayed as Sync_3' to the receiver 112 within the third scanner 11C.

Figure 8C:
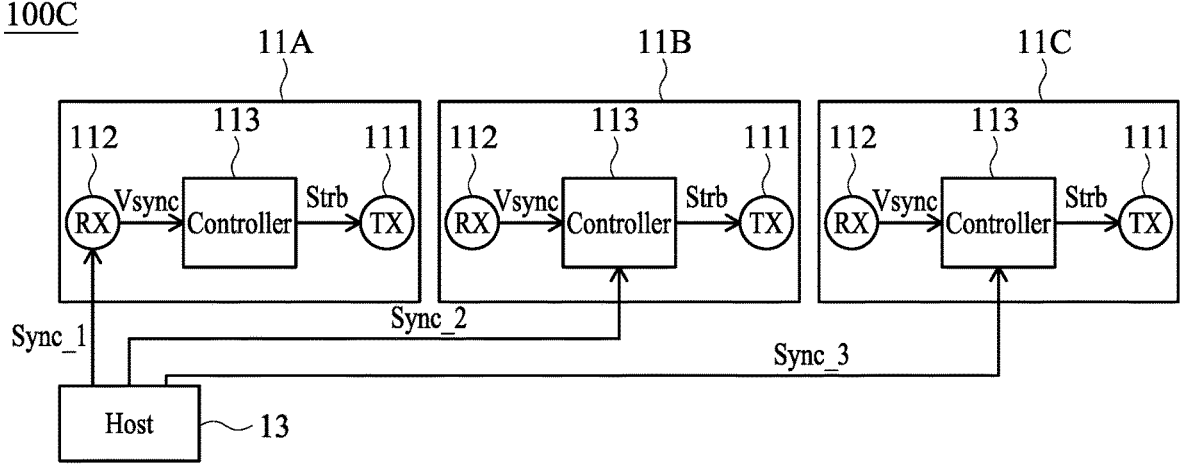
FIG. 8C shows a detailed block diagram illustrating a 3D sensing system with synchronous control according to a third exemplary embodiment of FIG. 7A.

FIG. 8C shows a detailed block diagram illustrating a 3D sensing system 100C with synchronous control according to a third exemplary embodiment of FIG. 7A. Specifically, in the embodiment, the trigger signals Sync_1 through Sync_3 are generated by the host 13, and received by either the receiver 112 or the controller 113 of the scanners 11A-11C. As exemplified in FIG. 8C, the first trigger signal Sync_1 is issued from the host 13 to the receiver 112 of the first scanner 11A; the second trigger signal Sync_2 is issued from the host 13 to the controller 113 of the second scanner 11B; and the third trigger signal Sync_3 is issued from the host 13 to the controller 113 of the third scanner 11C. Moreover, it is noted that the second trigger signal Sync_2 may be further relayed as Sync_2' to the receiver 112 within the second scanner 11B; and the third trigger signal Sync_3 may be further relayed as Sync_3' to the receiver 112 within the third scanner 11C.

Although specific embodiments have been illustrated and described, it will be appreciated by those skilled in the art that various modifications may be made without departing from the scope of the present invention, which is intended to be limited solely by the appended claims.

What is claimed is:

1. A three-dimensional sensing system, comprising:
   a plurality of scanners each emitting a light signal to a scene to be sensed and receiving a reflected light signal, according to which depth information is obtained;
   wherein only one of the plurality of scanners executes transmitting corresponding light signal and receiving corresponding reflected light signal at a time;
   wherein each of the plurality of scanners comprises:
      a transmitter that emits the light signal to the scene;
      a receiver that receives the reflected light signal; and
      a controller that obtains the depth information by processing the reflected light signal, and coordinates the transmitter and the receiver.

2. The system of claim 1, wherein the plurality of scanners adopt structured light technique by projecting a predetermined pattern onto the scene and then capturing a reflected pattern.

3. The system of claim 1, wherein the plurality of scanners adopt time-of-flight technique by transmitting the light signal onto the scene and then measuring round trip time of the reflected light signal.

4. The system of claim 1, wherein the transmitter comprises a laser or a light-emitting diode.

5. The system of claim 1, wherein the receiver comprises a camera.

6. The system of claim 1, wherein the plurality of scanners comprise a first scanner as a master scanner, a second scanner as a slave scanner and a third scanner as another slave scanner, and the plurality of scanners are activated by trigger signals.

7. The system of claim 6, wherein the first scanner issues a first trigger signal to the second scanner; and subsequently the second scanner issues a second trigger signal to the third scanner.

8. The system of claim 7, wherein the trigger signals are generated and received by controllers of the plurality of scanners.

9. The system of claim 7, wherein the trigger signals are generated and received by receivers of the plurality of scanners.

10. The system of claim 7, wherein the trigger signals are generated by receivers of the plurality of scanners, and received by controllers of the plurality of scanners.

11. The system of claim 7, wherein each of the plurality of scanners further comprises:
 a multiplexer, controlled by a corresponding controller, configured to receive a trigger signal of a preceding scanner and a corresponding trigger source, one of which is selected and forwarded to a corresponding receiver.

12. The system of claim 1, wherein the plurality of scanners comprise a first scanner as a host scanner, a second scanner as a guest scanner and a third scanner as another guest scanner, and the plurality of scanners are activated by trigger signals.

13. The system of claim 12, wherein the first scanner issues a first trigger signal to itself, next the first scanner issues a second trigger signal to the second scanner; and subsequently the first scanner issues a third trigger signal to the third scanner.

14. The system of claim 13, wherein the trigger signals are generated by the controller of the first scanner, and received by receivers of the plurality of scanners.

15. The system of claim 1, further comprising:
 a host that issues trigger signals to respectively trigger the plurality of scanners;
 wherein the plurality of scanners comprise a first scanner, a second scanner and a third scanner.

16. The system of claim 15, wherein the host issues a first trigger signal to the first scanner; next the host issues a second trigger signal to the second scanner; and subsequently the host issues a third trigger signal to the third scanner.

17. The system of claim 16, wherein the trigger signals are generated by the host, and received by receivers of the plurality of scanners.

18. The system of claim 16, wherein the trigger signals are generated by the host, and received by controllers of the plurality of scanners.

19. The system of claim 16, wherein the trigger signals are generated by the host, and received by either receiver or controller of the plurality of scanners.

* * * * *